United States Patent [19]

Mouille

[11] Patent Number: 4,458,861
[45] Date of Patent: Jul. 10, 1984

[54] ANTI-VIBRATORY SUSPENSION DEVICE FOR A HELICOPTER

[75] Inventor: René L. Mouille, Le Coton Rouge, France

[73] Assignee: Societe Nationale Industrielle et Aerospatiale, Paris, France

[21] Appl. No.: 364,227

[22] Filed: Apr. 1, 1982

[30] Foreign Application Priority Data

Apr. 10, 1981 [FR] France ................................ 81 07270

[51] Int. Cl.³ ............................................. B64C 27/04
[52] U.S. Cl. ................................. 244/17.27; 416/500; 248/638
[58] Field of Search ........................ 244/17.27; 74/574; 248/556, 557, 562, 564, 567, 636, 638, 648; 267/136, 141.1; 188/378, 379, 380; 416/170 B, 500

[56] References Cited

U.S. PATENT DOCUMENTS

| 3,845,917 | 11/1974 | Drees | 244/17.27 |
| 3,921,940 | 11/1975 | Mouille | 244/17.27 |
| 3,972,491 | 8/1976 | Ferris et al. | 244/17.27 |
| 4,140,028 | 2/1979 | Desjardins | 74/574 |
| 4,372,431 | 2/1983 | Desjardins | 244/17.27 |

FOREIGN PATENT DOCUMENTS 34092 8/1981 European Pat. Off. ......... 244/17.27

OTHER PUBLICATIONS

"Advanced Development of a Helicopter Rotor Isolation System for Improved Reliability", USAAMRDL—TR-77-23A, Dec. 1977, pp. 18, 30, 36, 35.

Primary Examiner—Trygve M. Blix
Assistant Examiner—Rodney Corl
Attorney, Agent, or Firm—Davis, Hoxie, Faithfull & Hapgood

[57] ABSTRACT

The invention relates to a suspension device for the main transmission box of a helicopter, comprising two flexible bars which are fixed centrally at the bottom of the transmission box and are supported by articulated joints at strong points of the fuselage and which carry swinging weights at their ends. An articulated rod connects the bottom of the transmission box and the fuselage.

6 Claims, 5 Drawing Figures

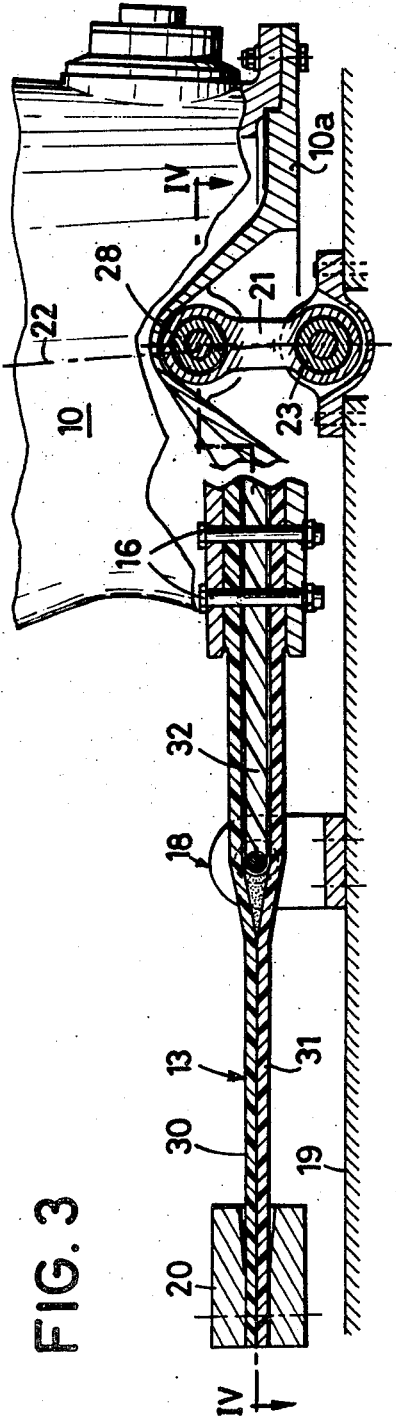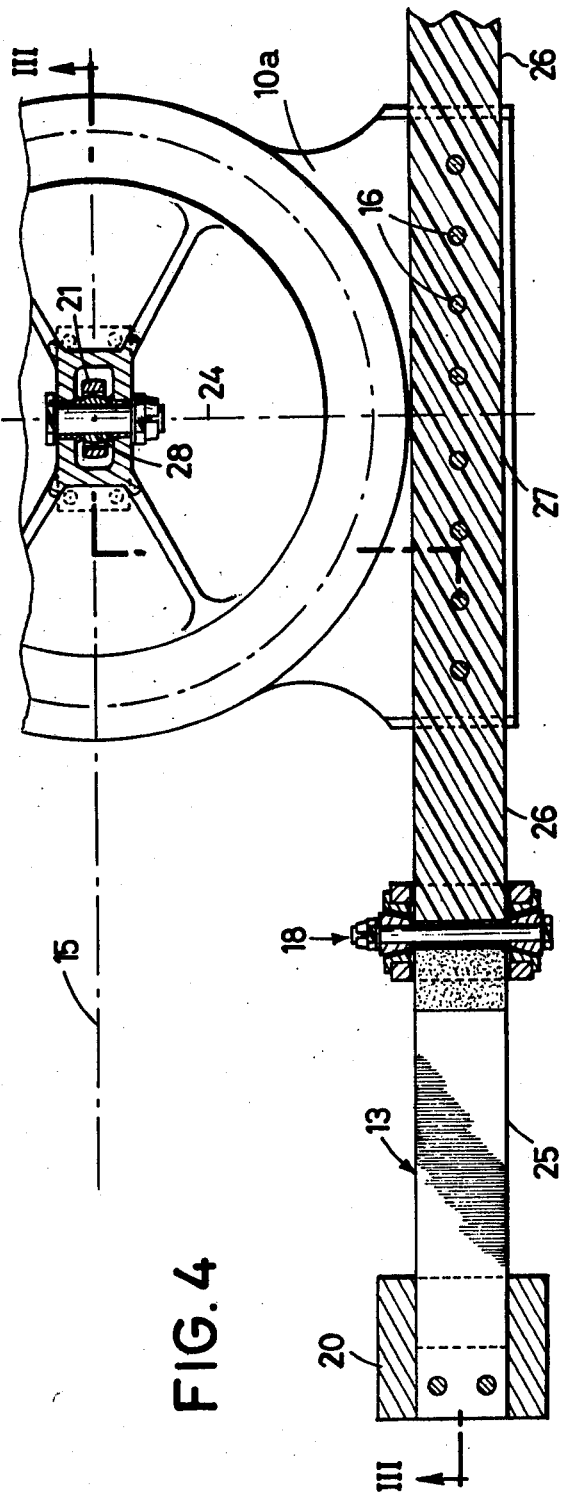

ANTI-VIBRATORY SUSPENSION DEVICE FOR A HELICOPTER

BACKGROUND OF THE INVENTION

The invention relates to an anti-vibratory suspension device for the main transmission box of a helicopter, comprising two deformable supports of a general elongate shape, which are arranged parallel to one another and to the longitudinal axis of the fuselage of the helicopter on either side of the transmission box to which they are connected, each being articulated, moreover, at two strong points of the structure of the fuselage and carrying a swinging weight at each of their free ends, whilst said supports, their points of articulation to the fuselage and the swinging weights which they carry are arranged symmetrically in relation to the longtitudinal plane as well as to the transverse plane passing through the axis of the rotor of the helicopter.

A suspension device of this type is known from U.S. Pat. No. 4,140,028 (Boeing). In this device, an assembly of ballasted levers and associated elastic arms connects the transmission box to the fuselage of the helicopter by means of a support system comprising, for each lever and associated elastic arm, two articulated joints, the first connecting the transmission box to the lever about a first pivot axle and the second connecting the fuselage to the lever about a second pivot axle offset relative to the first over the length of the lever, one of the pivot axles being located practically at one of the ends of the lever. In addition, this pair of supports of complex structure must be supplemented by complementary springs to eliminate the adverse effects of certain vibration forces occurring as a result of the offset between the two pivot axles and the points of transmission of the elastic forces.

SUMMARY OF THE INVENTION

In order to simplify such a device and make it perfectly capable of filtering all vibrations and transferring to the fuselage the reaction from the rotor drive torque and the dynamic moments originating from this rotor, the subject of the present invention is a suspension device of the type in question, wherein each support consists of a preferably straight bar made in one piece and fixed rigidly in its central part to the bottom of the transmission box, this bar comprising flexible parts between its central part and its articulated joints with the strong points of the fuselage and, beyond these articulated joints, relatively rigid parts ballasted at their ends with the above-mentioned swinging weights, whilst associated with this pair of bars is a vertical connecting rod located substantially in the axis of the rotor and connected by articulated joints, on the one hand, to the bottom of the transmission box and, on the other hand, to the structure of the fuselage, the suspension device consisting essentially of said pair of bars and said rod and being located completely between the bottom of the transmission box of the helicopter and its fuselage.

The device according to the invention has the advantage of being simple, light-weight and inexpensive. It also makes it possible to eliminate the set of oblique bars conventionally provided between the fuselage and the head of the transmission box so as to maintain the latter in position.

In a preferred embodiment, the bars have in their various parts a cross-section varying in size according to the forces to be withstood and the flexibility required. These bars can, on the other hand, be made of a composite material based on longtitudinal glass fibers and resin.

Because of its arrangement, the whole of the device described, which makes the connection between the rotor and the fuselage of a helicopter, effectively filters out the excitations of moments of force originating from the vibrations generated by the rotor in its own plane of rotation. These excitations predominate greatly in the case of rotors having more than two blades, since the dynamic moments introduce into the bars alternating flexions which give the end weights relatively substantial movements which, in turn, produce forces of inertia, the reactions of which at right angles to the points of connection of the bars to the fuselage are in a direction opposite to the elastic reactions.

On the other hand, because the forces in the axis of the rotor—particularly the lift of the rotor—pass directly from the bottom of the transmission box to the fuselage via the above-mentioned rod, the vertical vibrations are not filtered out, which is not especially troublesome in the case of rotors having more than two blades because, for these rotors, the level of vertical excitations is sufficiently low not to be actually detrimental to the comfort of the helicopter.

However, if the intention is to diminish the vertical dynamic forces transmitted to the fuselage so as to perfect the overall vibratory level of the helicopter, it is possible to perfect the device for connecting the transmission box to the fuselage by placing an additional filtering arrangement between the lower end of the supportrod and the resistant structure of the fuselage. This arrangement can consist of an elastic bar placed horizontally, to the center of which the rod is articulated and which can bend in a vertical plane on two supports fixed to the structure of the fuselage and located on either side of the center of the bar, the latter being prolonged beyond each of its supports, forming two levers ballasted with a weight at their ends. This additional arrangement is designed in size to transmit static vertical forces from the bottom of the transmission box to the fuselage and simultaneously to filter out the dynamic vertical forces because the latter cause, as a result of bending of the bar, movements of the end weights which, in turn, produce forces of inertia, the reactions of which at right angles to the fastenings to the structure are in a direction opposite to the elastic reactions.

The articulated connecting joints of the above-mentioned rod to the bottom of the transmission box and to the structure of the fuselage—either directly or via the filtering arrangement mentioned—are preferably ball-and-socket joints.

The following description, with reference to the drawings attached as non-limiting examples, will make it possible to understand clearly how the invention can be put into practice.

BRIEF DESCRIPTION OF THE DRAWINGS

FIG. 3 shows partially a practical exemplary embodiment of such a device, in a section along the line III—III of FIG. 4.

FIG. 4 shows a section along the line IV—IV of of the subject of FIG. 3.

DETAILED DESCRIPTION

Figure 1:
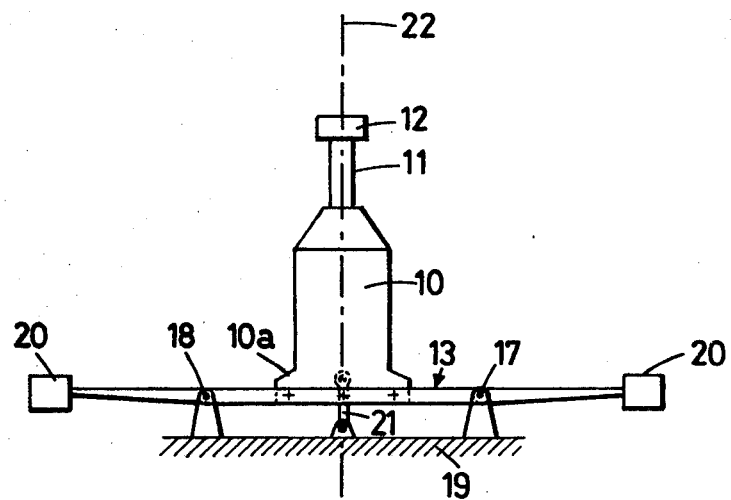
FIGS. 1 and 2 show diagrammatically, in a side elevation and in a plan view respectively, a suspension device according to the invention.
Figure 2:
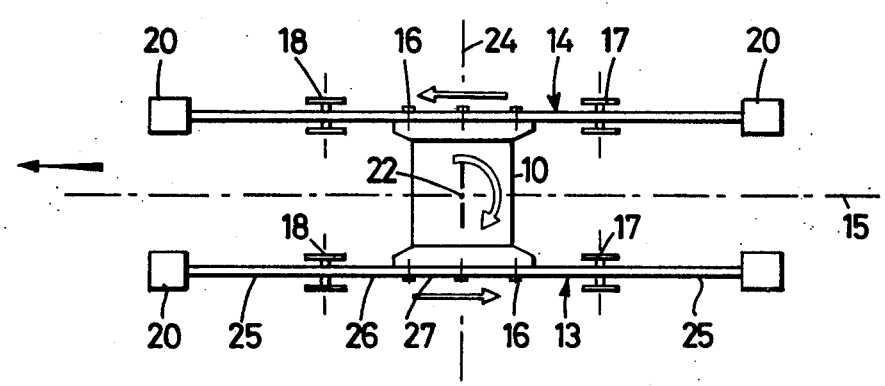

FIGS. 1 and 2 show the main transmission box 10 of a helicopter, which is located between a drive unit not shown and the shaft 11 of the rotor, the hub of which is indicated at 12. The base 10a of the housing of the transmission box is fixed rigidly by its side edges to two bars 13 and 14 parallel to one another and to the longtitudinal axis 15 of the machine. In the present example, these two bars are connected rigidly to the base 10a of the box by bolts 16, on the one hand, and are each articulated, on the other hand, at two strong points 17 and 18 of the structure 19 of the fuselage of the machine. Moreover, they are equipped at their free ends with swinging weights 20. FIG. 2 shows that the arrangement is completely symmetrical relative to the longtitudinal plane defined by the axis 15 and to the transverse plane 24 passing through the axis of rotation 22 of the rotor, on which axis the elements 10, 11 and 12 are aligned.

Together with these bars, the transmission box is connected to the structure 19 of the fuselage by means of an articulated rod 21 located centrally between the bottom 10a of said box and said structure 19 in the axis 22 of the rotor. This rod 21 ensures a firm and rigid connexion in a vertical direction and directly transmits to the structure 19 the lifting forces of the rotor, in such a way that these do not subject the bars 13, 14 to bending stress.

The two bars 13 and 14, which are preferably made of composite material such glass fibers coated in a thermosetting resin, transmit the reaction from the drive torque of the rotor from the transmission box 10 to the structure 19 by traction and compression (FIG. 2) and without any rotation of one bar relative to the other. On the other hand, the longitudinal and transverse tilting moments of the assembly consisting of the box 10, shaft 11 and rotor hub 12, which result from the forces or moments generated in the plane of the rotor, cause the bars 13 and 14 to bend. The dynamic moments give the end weights 20 substantial movements which, in turn, produce forces of inertia, the reactions of which at the fixing points 17 and 18 of the bars 13, 14 to the structure 19, are in a direction opposite to the elastic reactions.

Here, each of the two bars 13 and 14 may be considered as consisting of two identical half-bars symmetrical in relation to the transverse plane 24. Each half-bar comprises three parts, namely a part 25 on the outside of the support 18 which is equipped with a swinging weight 20 at its end and presents a rigidity just necessary to carry the latter, a part 26 contained between the articulated support 18 and the transmission box 10 which makes up the flexible part deformable under the action of the tilting forces exerted by said transmission box, and a part 27 for fixing to the bottom 10a of the transmission box.

The thickness and the materials constituting the parts 26 and 27 of the bars are selected so that the part 26 can bend under the influence of the tilting moments. The resistance of these two parts, which are located between the bottom 10a of the transmission box and the support on the structure 19, must be sufficient for them to be capable both of transmitting the tractive or compressive forces generated by the drive torque of the rotor and of withstanding the static and dynamic bending and tilting moments. In contrast, the end part 25 of the bars must withstand merely the alternating moments resulting from the forces of inertia generated by the swinging weight 20 which it carries, and its cross-section is smaller than the cross-section of the parts 26 and 27, so as to allow the weights 20 to execute substantial relative movements, assisting the creation of high forces of inertia.

The dimensions of the bars 13,14, the distances between the bottom 10a of the main transmission box, the points of articulation of said bars to the structure 19, and the weights 20, as well as the size of these weights are selected in such a way that there is a balance between the reactions of various types at the fixing points on the structure.

In the practical exemplary embodiment illustrated in FIGS. 3 and 4, the elements of the suspension device shown diagrammatically in FIGS. 1 and 2 bear the same reference numerals. The bars 13 and 14 consist of flat strips 30, 31, made of laminates, extending from one end of a bar to the other. Between the support points 17 and 18 of each bar on the structure 19, this bar is reinforced by introducing between the flat strips 30 and 31 a filling 32 consisting of a "compound" made of glass fibers embedded in resin.

The vertical rod 21 is articulated, on the one hand, to the bottom 10a of the transmission box 10 by means of a ball-and-socket joint 28, and to the top of the structure 19 likewise by means of a ball-and-socket joint 23.

Figure 5:
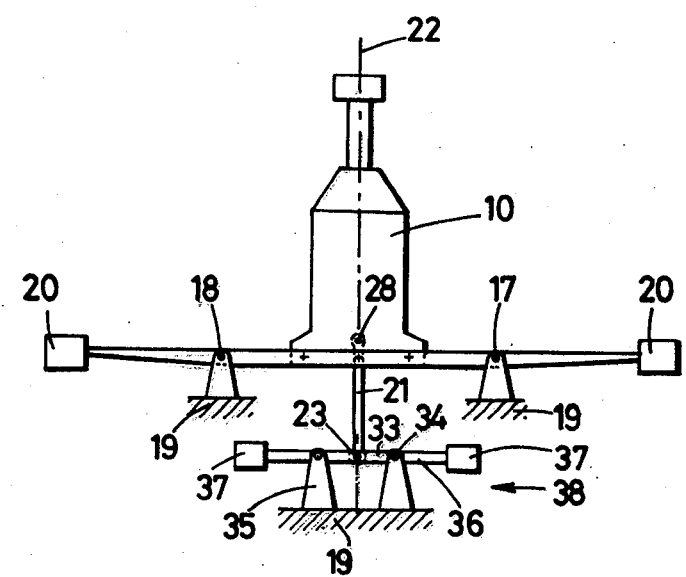
FIG. 5 shows, in the manner of FIG. 1, a suspension device according to the invention provided with an additional arrangement for filtering out the vertical vibrations.

If it seems of interest to improve the vibratory level by also filtering out the vertical vibrations originating from the rotor, there is added, as shown in FIG. 5, between the base of the vertical rod 21 and the fuselage 19 an additional filtering assembly 38 consisting of a bar 33 made, for example, of a laminate of glass fibers and resin, which bears by means of two hinged bearings 34 on two supports 35 fixed to the fuselage 19 and which is prolonged on either side of these supports by two levers 36, each carrying a swinging weight 37 at their end, the assembly being symmetrical in relation to the axis 22.

The static vertical forces originating from the rotor, essentially the lift of the rotor, are absorbed by bending of the bar 33 and are transmitted to the fuselage 19 via the two supports 35. The dynamic vertical forces cause alternating bending of the bar 33 and oscillation of the weights 37 about the articulated joints 34, introducing into these articulated joints vertical forces of inertia in a direction opposite to the elastic reactions, practically cancelling the latter and thus filtering out the vertical vibrations originating from the rotor.

I claim:

1. An antivibration suspension device for the main transmission box of a helicopter comprising two elongated, flexible, elastic bars arranged parallel to each other and to the longitudinal axis of the helicopter fuselage at opposite sides of the transmission box and each of said bars being pivotally connected at two points to the fuselage structure and having swinging bodies at its extremities, said bars, the pivotal connections and the swinging bodies being symetrically arranged with respect to both the longitudinal and the transverse planes through the rotor shaft of the helicopter; means rigidly connecting the base of the transmission box with each elastic bar in a region intermediate the pivotal connections between the bar and the fuselage structure, whereby each bar is made rigid in said intermediate region and has flexible portions between that region and the pivotal connections to the fuselage structure; and a rod extending substantially in line with the helicopter rotor shaft and connected at its opposite ends with the base of the transmission box and the fuselage structure, the transmission box being suspended through essentially only the bars and the rod and the latter serving to relieve the bars of the lifting forces imposed on the transmission box.

2. Device according to claim 1, wherein the dimensions of the bars, the distance between the base of the transmission box and the support points of the said bars, and the distance between the base of the transmission box and the swinging bodies are selected to produce an equilibrium between the various reactions at the articulated support points.

3. Device according to claim 1, wherein the bars have different parts adapted to the stresses to be supported.

4. Device according to claim 1, wherein said rod is articulately connected to the transmission box and the fuselage.

5. Device according to claim 3, characterized in that the said bars are made of a fiber glass-resin composite material.

6. In an antivibration suspension device for the main transmission box of a helicopter of the type embodying two generally elongated flexible supports, arranged parallel to each other and to the longitudinal axis of the helicopter fuselage, each of said supports being articulately supported at two points on the helicopter fuselage and having swinging bodies at its extremities, the support points and the swinging bodies being arranged symetrically with respect to a vertical plane through the longitudinal axis of the helicopter fuselage and with respect to a transverse plane through the rotor shaft of the helicopter, the improvement comprising a rod extending substantially in line with the helicopter rotor shaft connecting the base of the transmission box to the helicopter fuselage, said rod being articulately fixed to the midpoint of an elastic horizontal bar mounted for bending vertically on two supports fixed to the structure of the fuselage, said bar extending beyond each of said supports and having weights at each end, and means securing the transmission box over its entire length to the flexible supports, each of said flexible supports being composed of a single bar having a flexible portion extending between the base of the transmission box and the support point and a relatively rigid part extending from the support point to the swinging body, the entire suspension device being between the base of the transmission box and the helicopter fuselage.

* * * * *